(12) United States Patent
Glaesman et al.

(10) Patent No.: US 11,754,187 B2
(45) Date of Patent: Sep. 12, 2023

(54) DEPLOYABLE PRESSURE ENERGIZED SEALING BACKUP SYSTEMS FOR IMPROVED LONG TERM RELIABILITY

(71) Applicant: Halliburton Energy Services, Inc., Houston, TX (US)

(72) Inventors: Chad William Glaesman, McKinney, TX (US); Kent Wayne Ferrell, Blooming Grove, TX (US); Mohan Gunasekaran, Rio de Janeiro (BR)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/070,156

(22) Filed: Oct. 14, 2020

(65) Prior Publication Data
US 2021/0156479 A1 May 27, 2021

Related U.S. Application Data

(60) Provisional application No. 62/940,478, filed on Nov. 26, 2019.

(51) Int. Cl.
*F16J 15/34* (2006.01)
*F16J 15/38* (2006.01)

(52) U.S. Cl.
CPC .......... *F16J 15/3464* (2013.01); *F16J 15/38* (2013.01)

(58) Field of Classification Search
CPC ...... F16J 15/34; F16J 15/3404; F16J 15/3408; F16J 15/3464; F16J 15/38
See application file for complete search history.

(56) References Cited

U.S. PATENT DOCUMENTS

| | | | | |
|---|---|---|---|---|
| 3,563,442 A | * | 2/1971 | Kretchman | F16J 15/3236 277/455 |
| 4,690,414 A | * | 9/1987 | Haaland | F16L 21/03 285/345 |
| 5,687,997 A | * | 11/1997 | Beacom | F16L 21/035 285/379 |
| 9,447,881 B2 | * | 9/2016 | Tsuji | F16J 15/064 |
| 10,378,653 B2 | * | 8/2019 | Beckmann | F16L 21/02 |
| 2005/0109502 A1 | * | 5/2005 | Buc Slay | B82Y 30/00 166/179 |
| 2010/0219592 A1 | * | 9/2010 | Tuckness | F16J 15/20 277/638 |
| 2017/0122055 A1 | * | 5/2017 | Embury | E21B 3/00 |

FOREIGN PATENT DOCUMENTS

CN 201396436 Y 2/2010

* cited by examiner

*Primary Examiner* — Gilbert Y Lee
(74) *Attorney, Agent, or Firm* — Scott Richardson; Parker Justiss, P.C.

(57) ABSTRACT

Provided is a sealing ring and a sealing system. The sealing ring, in one aspect, includes a sealing ring member having an inside diameter face, an outside diameter face, a primary seal side face, and a gland side face. The sealing ring according to this aspect further includes a secondary seal coupled to at least one of the inside diameter face, the outside diameter face, the primary seal side face or the gland side face.

15 Claims, 8 Drawing Sheets

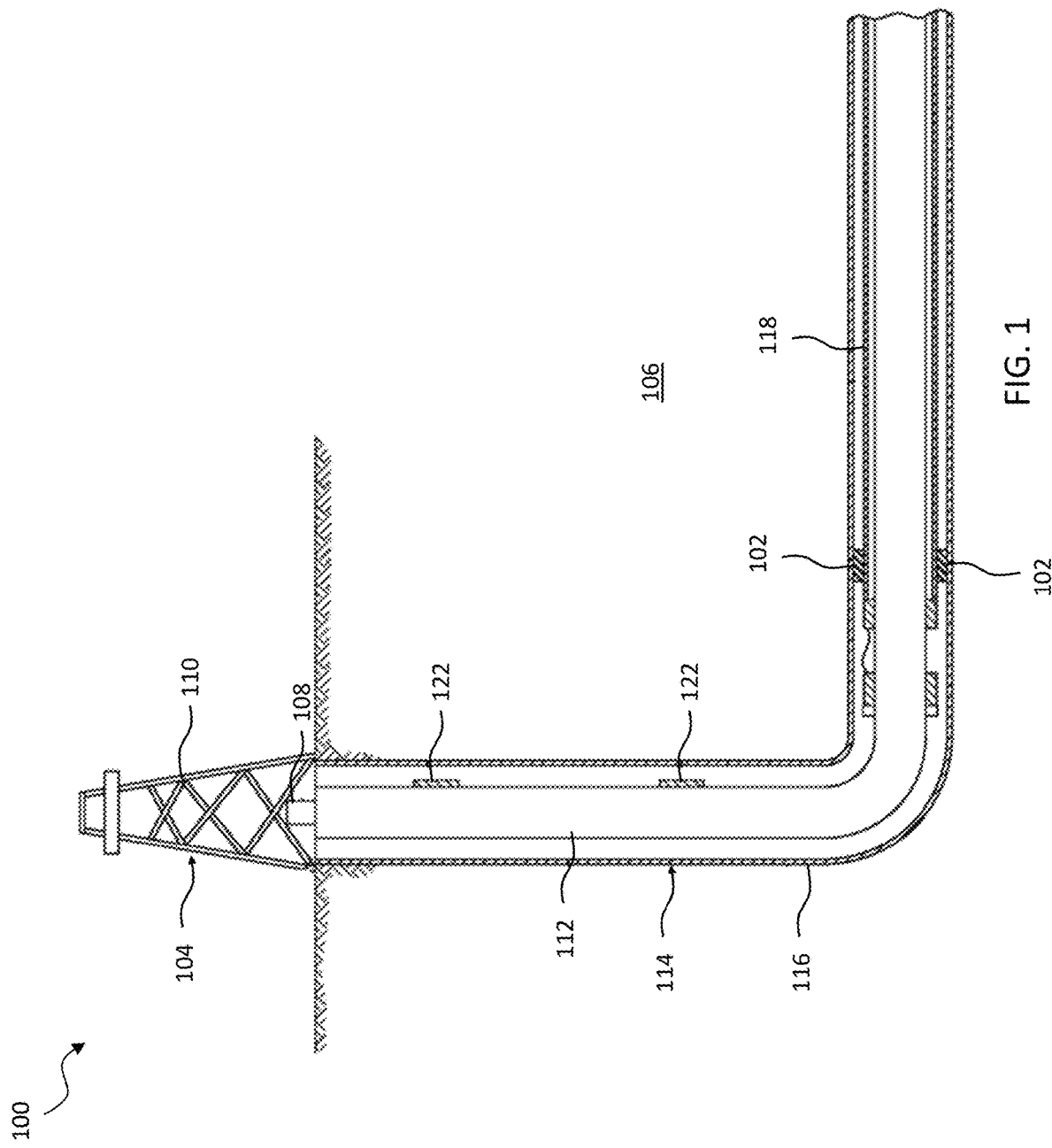

DEPLOYABLE PRESSURE ENERGIZED SEALING BACKUP SYSTEMS FOR IMPROVED LONG TERM RELIABILITY

CROSS-REFERENCE TO RELATED APPLICATION

This application claims the benefit of U.S. Provisional Application Ser. No. 62/940,478, filed on Nov. 26, 2019, and entitled "DEPLOYABLE PRESSURE ENERGIZED SEALING BACKUP SYSTEMS FOR IMPROVED LONG TERM RELIABILITY," commonly assigned with this application and incorporated herein by reference in its entirety.

BACKGROUND

Wells may be drilled into subterranean formations to recover valuable hydrocarbons. Various operations may be performed before, during, and after the well has been drilled to produce and continue the flow of the hydrocarbon fluids to the surface.

A typical process concerning oil and gas operations may be to apply a seal within a well. A seal may isolate and contain produced hydrocarbons and pressures within the well. There may be a variety of different tools and equipment used to create seals between two or more different surfaces, including between the outside of a production tubing string and the inside of a casing string, liner, or the wall of a wellbore. Substantial pressure differentials across a seal may induce failure of the seal and may result in substantial loss of time, money, and equipment, and may even result in harm to individuals. Additionally, expanding a wellbore seal may induce substantial deformation and internal stress on a sealing element, which may increase the chance of failure (e.g., due to breaking or tearing).

Elastomeric seals often suffer losses in their sealing capacity, particularly when used over long service periods at elevated temperatures (e.g., due to stress relaxation, thermal aging, and permanent dimensional changes). These changes in the seal are especially impactful during thermal cycling, where service at lower and in some cases sub-ambient temperatures are required. The loss of sealing force over time will continue to degrade the performance of the seal and will ultimately lead to leaking.

It may be suitable to explore alternative seals and manufacturing processes to achieve improved sealing.

BRIEF DESCRIPTION

Reference is now made to the following descriptions taken in conjunction with the accompanying drawings, in which:

FIG. 1 illustrates a well system designed, manufactured and operated according to the disclosure;

DETAILED DESCRIPTION

Figure 2B:
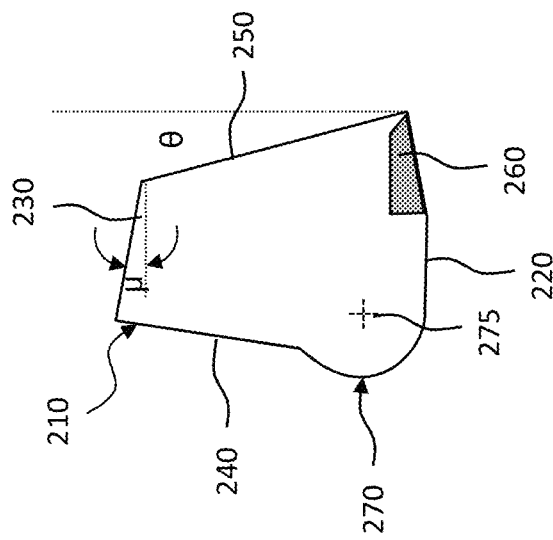
FIGS. 2A through 2C illustrate a perspective view and a cross-sectional views of a sealing ring designed, manufactured and operated according to the disclosure.

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms.

Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "uphole," "upstream," or other like terms shall be construed as generally toward the surface of the ground; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical axis. In some instances, a part near the end of the well can be horizontal or even slightly directed upwards. In such instances, the terms "up," "upper," "upward," "uphole," "upstream," or other like terms shall be used to represent the toward the surface end of a well. Unless otherwise specified, use of the term "subterranean formation" shall be construed as encompassing both areas below exposed earth and areas below earth covered by water such as ocean or fresh water.

Referring initially to FIG. 1, schematically illustrated is a well system 100. The well system 100 of FIG. 1, without limitation, includes a downhole tool 102 (e.g., packer, safety valve, disconnect, sand control device, electrohydraulic disconnect tool, etc.), including a seal system designed, manufactured and operated according to the present disclosure. Surface equipment 104 may be disposed above a subterranean formation 106. As illustrated, surface equipment 104 may include a hoisting apparatus 108 and a derrick 110. Hoisting apparatus 108 may be used for raising and lowering pipe strings, such as a conveyance line 112. Conveyance line 112 may include any suitable means for providing mechanical conveyance for the downhole tool 102, including, but not limited to, wireline, slickline, coiled tubing, tubing string, pipe, drill pipe, drill string or the like. In some examples, conveyance line 112 may provide mechanical suspension, as well as electrical connectivity, for one or more downhole tools. As illustrated, downhole tools may be disposed on and/or around conveyance line 112. This may allow an operator to actuate the downhole tool 102, for example to seal off a portion of a wellbore 114.

As illustrated, wellbore tools may be run into wellbore 104 on conveyance line 112. Wellbore 114 may extend through the various earth strata including formation 106. A casing 116 may be secured within wellbore 114 by cement (not shown). Casing 116 may be made from any material such as metals, plastics, composites, or the like, may be expanded or unexpanded as part of an installation procedure. Additionally, it is not necessary for casing 116 to be cemented into wellbore 114. In examples, production tubing 118 may be secured within casing 116. Production tubing 118 may be any suitable tubing string utilized in the production of hydrocarbons. In examples, production tubing may be permanently disposed within casing 116 by cement (not shown). The downhole tool 102 may be disposed on or near production tubing 118.

Without limitation, any suitable type of downhole tool 102 may be used. In one embodiment, the downhole tool 102 is a packer. Suitable types of packers may include, whether they are permanently set or retrievable, mechanically set, hydraulically set, and/or combinations thereof. As will be discussed in more detail below, the packer may include one or more sealing elements. The packer may be set downhole to seal off a portion of wellbore 114. When set, the packer may isolate zones of the annulus between wellbore 114 and a tubing string by providing a seal between production tubing 118 and casing 116. In examples, the packer may be disposed on production tubing 118. The downhole tools may be disposed around conveyance line 112 and run into wellbore 114 when desired to actuate the packer. Downhole tools may temporarily couple to the packer to initiate a sealing operation within wellbore 114.

It should be understood by those skilled in the art that present examples are equally well suited for use in wellbores having other directional configurations including vertical wellbore, horizontal wellbores, deviated wellbores, multilateral wells and the like. Also, even though FIG. 1 depicts an onshore operation, it should be understood by those skilled in the art that the packer of the present invention is equally well suited for use in offshore operations. In addition, while FIG. 1 depicts use of a downhole tool 102 in a cased portion of wellbore 114, it should be understood that the downhole tool 102 might also be used in uncased portions of wellbore 114.

While the embodiment of FIG. 1 has focused on downhole tools that are packers, those skilled in the art understand that any other downhole tool in need of any sealing system, might use a sealing system designed, manufactured, and operated according to the disclosure.

The improved sealing system described in this disclosure will utilize a geometrical design of a sealing ring (e.g., thermoplastic sealing ring) with a secondary seal at an opposite sealing surface thereof. This will reduce the impact to performance that the long-term aging has on the primary seal, improving the low temperature performance for open gland sealing connections. The type of sealing ring material is not imperative to the functionality of the sealing ring, and should be selected based on the temperature, environmental inputs, and loading scenario.

One improvement in this design is that the sealing ring in this design has a secondary seal (e.g., sealing mechanism) on the inside diameter (ID), outside diameter (OD) of sides of the sealing ring. In many embodiments, the secondary seal is located on the ID. When energized, the primary seal will deform the thermoplastic material and rotate the seal ring, and thus secondary seal, into place. This rotation will also create a chamfer that will preferentially load the primary seal towards the mating seal bore, increasing the contact stress at the primary seal location as well as the secondary sealing location. With a single primary seal only, increasing the contact stress at either the ID or OD comes with a loss of contact stress at the opposite sealing surface. This design eliminates that tradeoff, improving the sealing force at both sealing surfaces over the service life.

The successful design and implementation of this technology will increase the service life of any commercial elastomeric sealing material and configuration. This sealing design concept can be used in conjunction with standard O-ring sealing components or can use custom molded and/or bonded seals as the primary seals for other services like those requiring pressure unloading. The design also reduces the risk and force associated with downhole stabbing of the seal assembly, as the secondary seals do not engage until a pressure differential is applied to the primary seal.

The sealing connection uses the ramped feature of the seal ring to force the primary seal in the form of a bonded seal or O-ring towards the OD of the sealing connection. This creates a loading towards the OD that rolls or pivots the seal ring towards the gland boundary, which then engages the secondary seal at the ID of the connection. This configuration allows increasing contact stress at both sealing surfaces with increasing differential pressure. It also minimizes the effect that high hydrostatic pressures have on the overall sealing connection, as it is less dependent on the volume of a single component. Additional differential pressure serves to increase contact stresses at both sealing surfaces improving the low temperature sealing performance. The propping of the primary seal in the non-bonded application can also be designed to utilize friction to remain energized even after the differential pressure is bled off. While this paragraph has referenced a situation where the primary seal seals toward the OD, and the secondary seal seals toward the ID, those skilled in the art understand that the shape of the seal ring could be reversed, wherein the primary seal seals toward the ID and the secondary seal seals toward the OD.

For one sided closed gland connections, the secondary seal can be placed on the axial face opposite the primary seal. The secondary seal could also be located such that no rotation of the backup ring is required for deployment. This may come at the expense of installation and friction during dynamic operations, but may work just the same. This design, however, may be more desirable for the bonded configurations used in pressure unloading or static sealing connections.

Figure 2A:
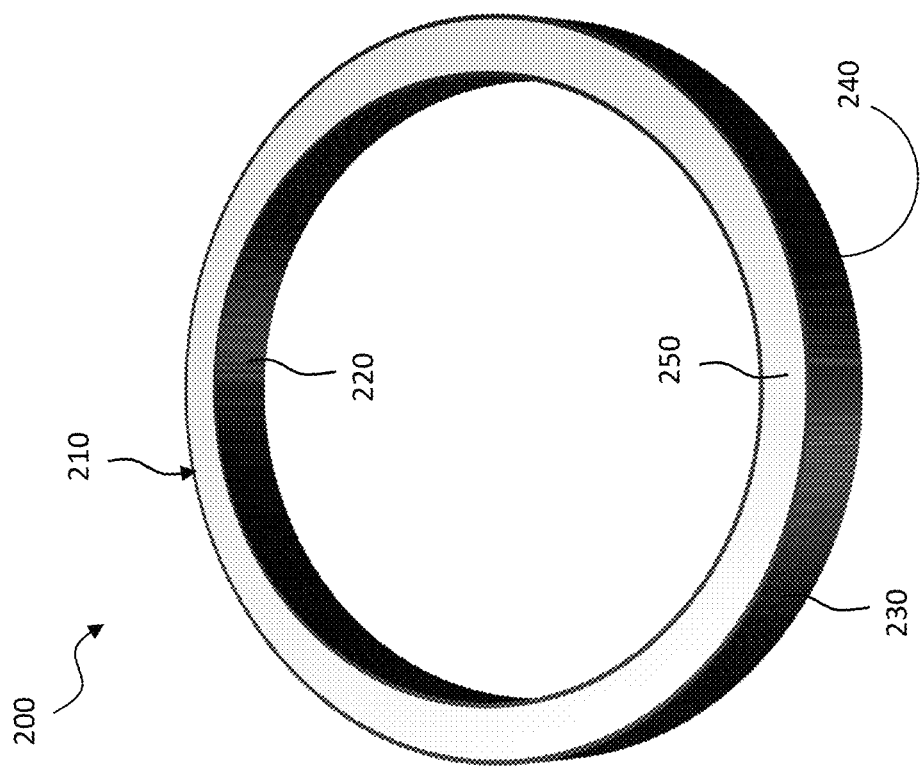

Turning to FIGS. 2A and 2B, illustrated are a perspective view and a cross-sectional view of a sealing ring 200 designed, manufactured and operated according to the disclosure. The sealing ring, in the embodiment of FIGS. 2A and 2B includes a sealing ring member 210 having an inside diameter face 220, an outside diameter face 230, a primary seal side face 240, and a gland side face 250. The seal ring member 210 may comprise many different materials and remain within the purview of the disclosure. In one embodiment, however, the seal ring member 210 comprises one or more of the following materials: Polyether ether ketone [PEEK] PEK, PEEKK, PEKEKK; Polytetra fluoro ethylene [PTFE]—Teflon; Polyphenylene Sulfide [PPS]—Ryton; Polyvinylidene Fluoride [PVDF]—Kynar; Polyimide [PI]—Vespel; Polytherimide [PEI]—Ultem, among others.

In accordance with the disclosure, the sealing ring 200 includes a secondary seal 260 coupled to at least one of the inside diameter face 220, the outside diameter face 230, the primary seal side face 240 or the gland side face 250. In the illustrated embodiment of FIGS. 2A and 2B, the secondary seal 260 is coupled to the inside diameter face 220. In another embodiment, not shown, the secondary seal 260 is coupled to the outside diameter face 230. In yet another embodiment, the secondary seal 260 is coupled to the primary seal side face 240 or the gland side face 250, or any combination of the above.

The secondary seal 260 may comprise many different materials and remain within the purview of the disclosure. Nevertheless, in one embodiment the secondary seal comprise one or more of the following materials: Perfluorinated Elastomer [FFKM]—Chemraz, Kalrez, Petroz, Chemtec; Fluorinate Ethylene Propylene Monomer [FEPM]—Aflas; Fluoropolymer [FKM]—Viton, Technoflon; Hydrogenated Nitrile Butadiene [HNBR]—Zetpol, Therban; Nitrile Butadiene Rubber [NBR]—Nipol, Buna N; Ethylene Propylene [EP]—Same as EPDM; Ethylene Propylene Diene [EPDM]—Vistalon, Nordel, Royalene; Fluorosilicone [FVMQ]; Chloronated Polyethylene [CM]—Tyrin; Chlorosulfonated Polyethylene [CSM]—Hypalon; Epichlorohydrin [ECO]—Hydrin; Ethylene Acrylic [AEM]—Vamac; Isobutylene [IIR]—Butyl; Polyacrylate [ACM]—HyTemp; Polybutadiene [BR]—Budene; Polychloroprene [CR]—Bayprene; Polyisoprene [NR, IR]—Natural Rubber or Natsyn; Polyurethane [AU or EU]—Millthane; Styrene Butadiene [SBR]—Plioflex; Silicone [VMQ, PMQ, PVMQ]—Elastosil. In yet other embodiments, the secondary seal may comprise Thermoplastic Elastomers [TPE]—Hytrel or Thermoplastic Vulcanizates [TPV]—Santoprene, among others.

In the illustrated embodiment, the primary seal side face 240 has a ramp member 270. Further to the embodiment of FIGS. 2A and 2B, the ramp member 270 is a lobe member having a centerpoint 275, and further wherein the centerpoint 275 of the lobe member is positioned more proximate the inside diameter face 220 than the outside diameter face 230. The lobe member, in the illustrated embodiment, is a curved surface, and thus in one embodiment includes a radius of curvature. Notwithstanding, in other embodiments the ramp member 270 is a simple bevel or other shape operable to drive the primary seal member a desired direction (e.g., radially outward or radially inward in certain examples). Further to the embodiment of FIGS. 2A and 2B, the gland side face 250 slopes inward toward the seal side face 240 as it moves from the inside diameter face 220 to the outside diameter face 230. For example, the gland side face 250 may, in one embodiment, slope inward from about 2 degrees (θ) to about 20 degrees (θ) from vertical. The gland side face 250 may, in another embodiment, slope inward from about 6 degrees (θ) to about 14 degrees (θ) from vertical.

Figure 2C:
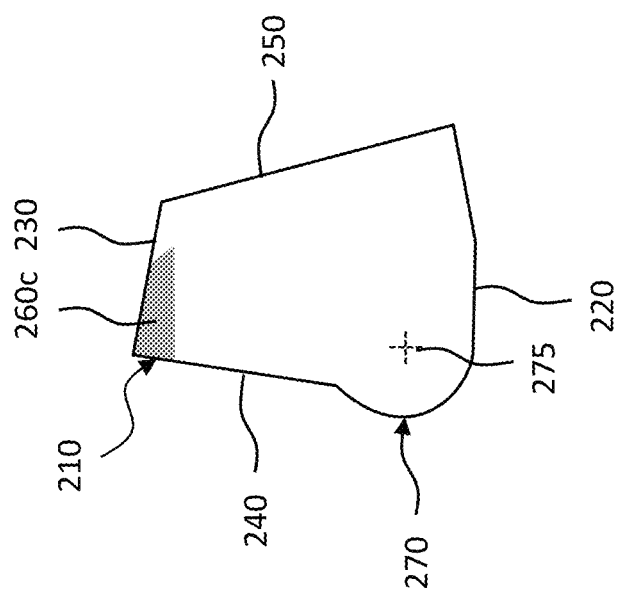

Further to the embodiment of FIGS. 2A and 2B, the outside diameter face 230 slopes upward as it moves from the gland side face 250 to the seal side face 240. For example, the outside diameter face 230 may, in one embodiment, slope upward from about 2 degrees (u) to about 10 degrees (u) from horizontal. Further to the embodiment of FIGS. 2A and 2B, at least a portion of the inside diameter face 220 may slope downward as it moves from the gland side face 250 to the seal side face 240, whereas another portion of the inside diameter face 220 is substantially horizontal. Turning briefly to FIG. 2C, illustrated is another embodiment wherein the secondary seal 260c is coupled to the outside diameter face 230.

Figure 3:
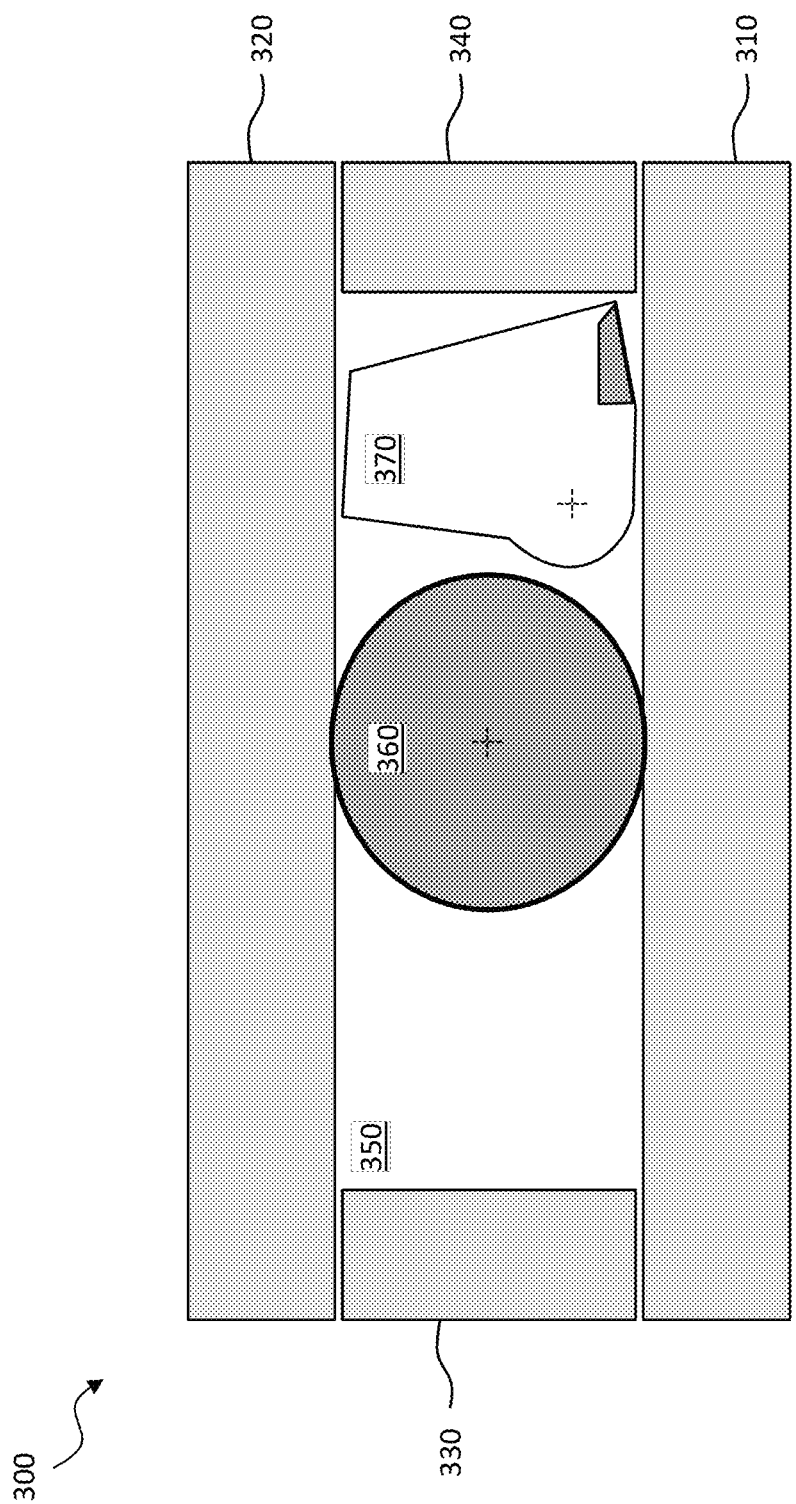
FIGS. 3-7 illustrate various different embodiments of sealing systems designed, manufactured and operated according to the disclosure.

Turning now to FIG. 3, illustrated is one embodiment of a sealing system 300 designed, manufactured and operated according to the disclosure. The sealing system 300, in the illustrated embodiment, includes an inside member 310, an outside member 320, and two side members 330, 340 forming a seal gland 350. The insides member 310, in one embodiment, is a mandrel. In the embodiment of FIG. 3, a primary seal 360 is located within the seal gland 350. The primary seal 360, in the illustrated embodiment, is an O-ring seal. Nevertheless, other primary seals, regardless of shape or material, are within the scope of the disclosure. The primary seal 360, in one embodiment, may comprise the same materials discussed above with regard to the secondary seal, but may comprise different materials as well.

Further to the embodiment of FIG. 3, a seal ring 370, which may be similar to the seal ring 200 discussed above, may be located within the seal gland 350 proximate the primary seal 360. In the illustrated embodiment, the primary seal side face of the seal ring 370 is pointing toward the primary seal 360.

Figure 4:
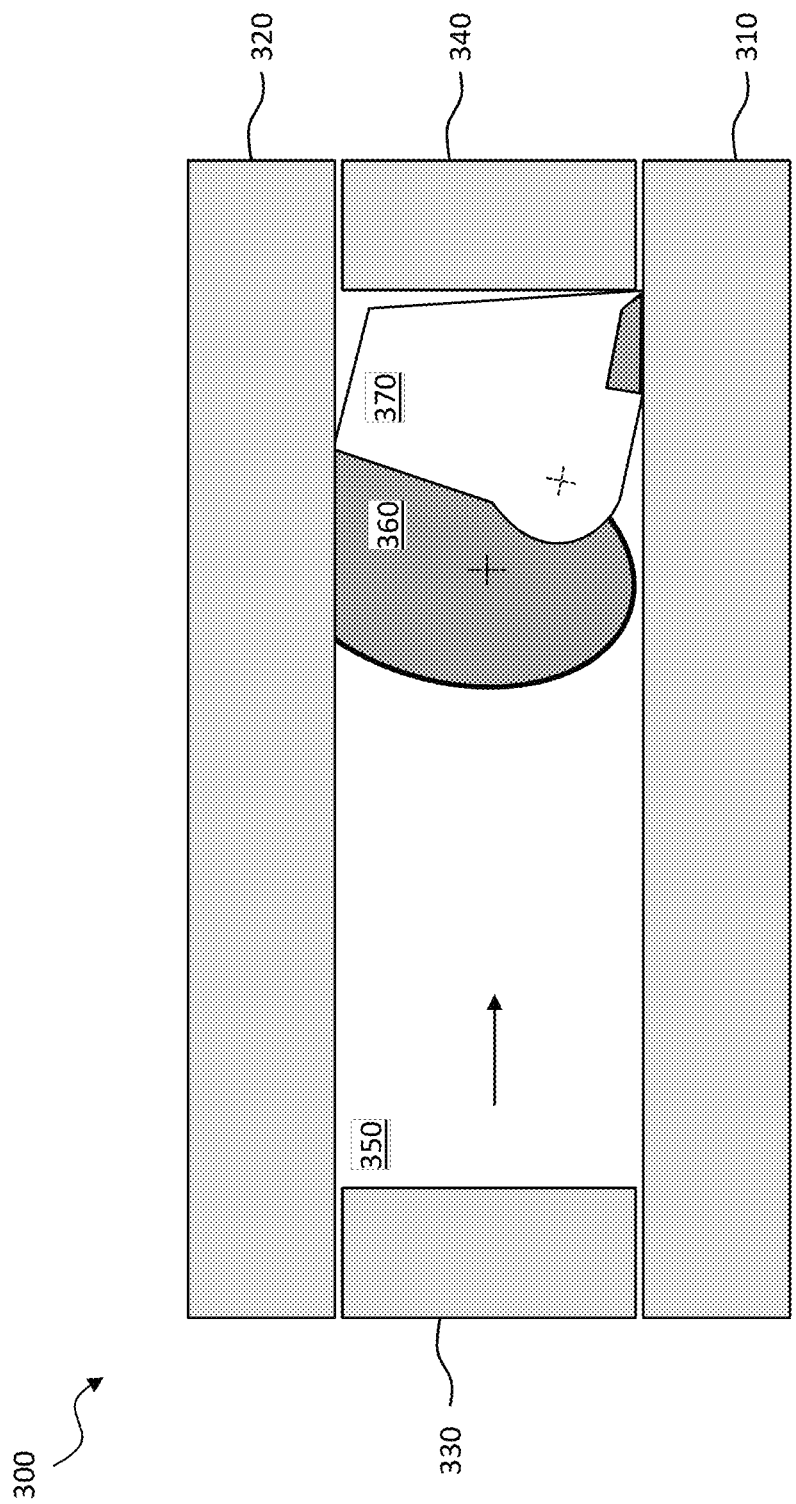

Turning now to FIG. 4, illustrated is the sealing system 300 of FIG. 3 in an energized state, such as is the case if the primary seal 360 were being exposed to pressure from the left hand side. In this embodiment, the pressure from the left hand side pushes the primary seal 360 against the seal ring 370. In this example, when the primary seal 360 engages the ramp member, the seal ring 370 rotates (e.g., clockwise), thereby causing the secondary seal to engage the inside member 310. Furthermore, the primary seal 360 may rise off of the inside member 310 when energized, thereby presenting the problem (e.g., fluid path) along the inside member 310 that the secondary seal is designed to remedy. Thus, in this scenario, the primary seal 360 seals against the outside member 320, while the secondary seal ring 370 seals against the inside member 310.

Figure 5:
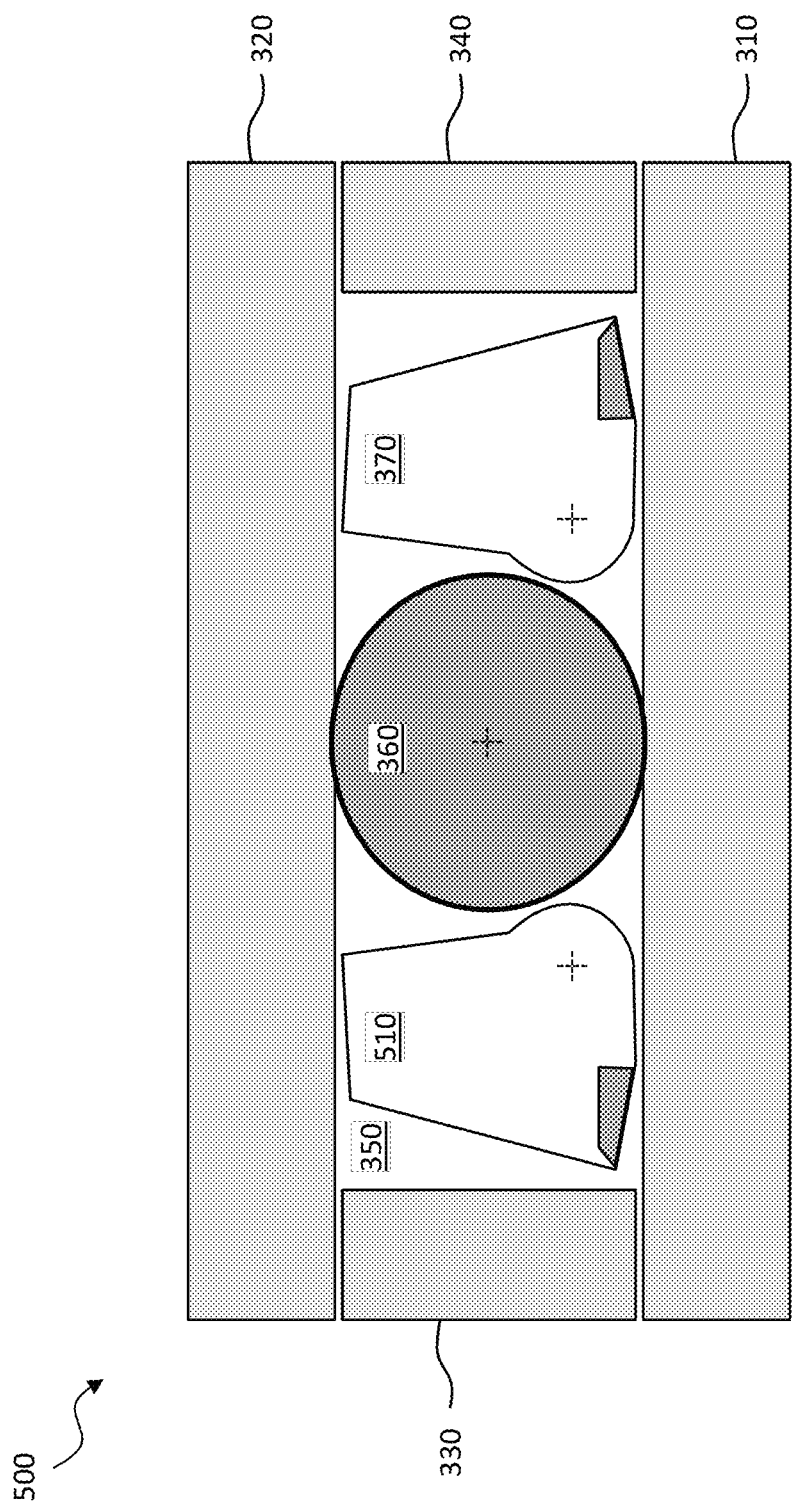

Turning now to FIG. 5, illustrated is one embodiment of a sealing system 500 designed, manufactured and operated according to the disclosure. The sealing system 500 is similar in many respects to the sealing system 300 illustrated in FIG. 3. Accordingly, like reference numbers have been used to indicate similar features. The sealing system 500 differs, for the most part from the sealing system 300, in that the sealing system 500 includes a second seal ring 510. The second seal ring 510 may be similar, if not identical, to the seal ring 370. The sealing system 500, in contrast to the sealing system 300, is capable of handling pressure from both the left and right sides.

Figure 6:
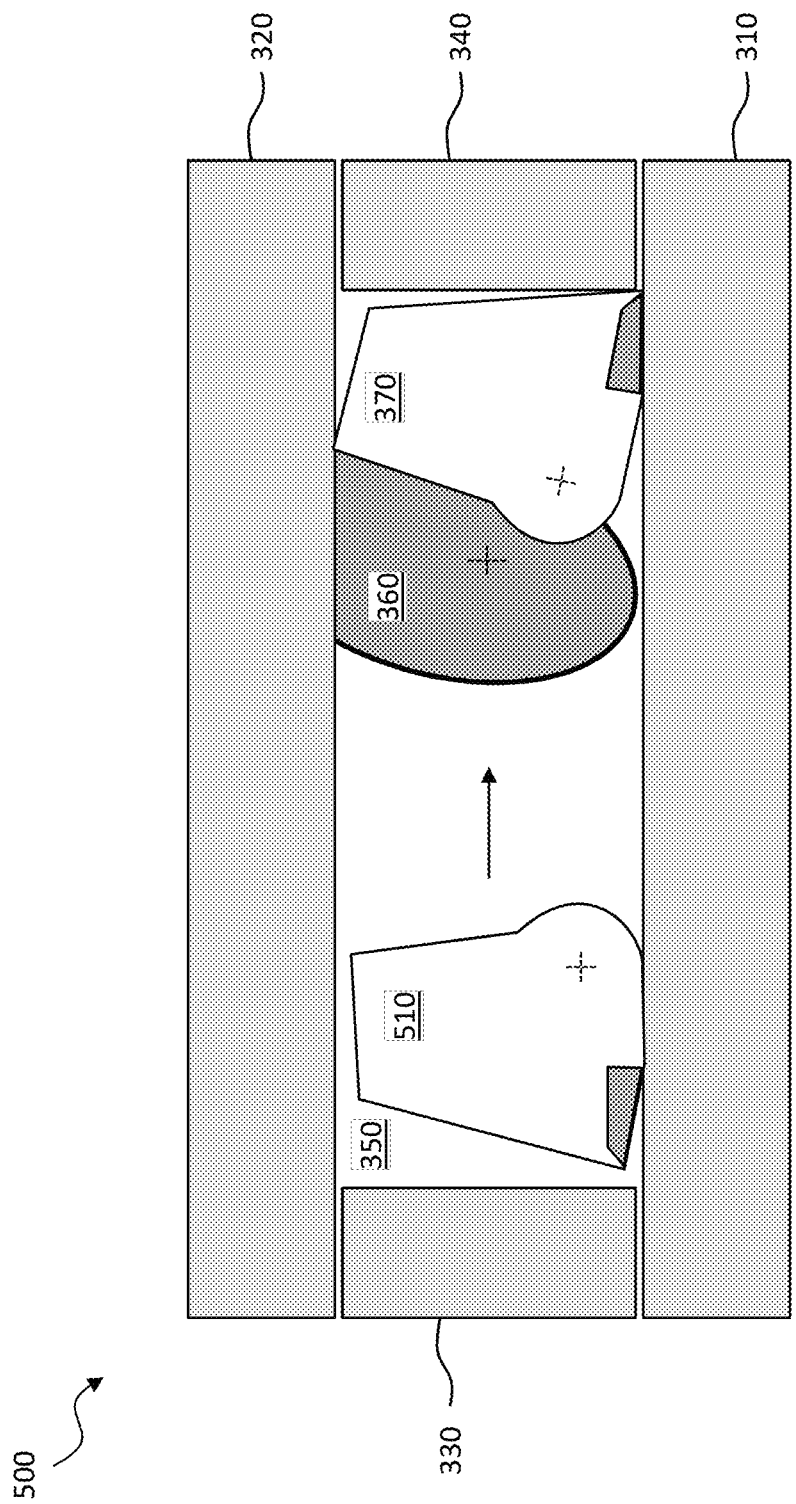

Turning now to FIG. 6, illustrated is the sealing system 500 of FIG. 5 in an energized state, such as is the case if the primary seal 360 were being exposed to pressure from the left hand side. In this embodiment, the pressure from the left hand side may pass over and/or under the second seal ring 510, thereby pressuring down on the primary seal 360 and forcing it to the right against the seal ring 370. In an alternative embodiment, not shown, the pressure from the left might pressure down on the second seal ring 510, and in turn force all of the second seal ring 510, primary seal 360 and seal ring 370 to the right, thereby sandwiching the primary seal 360 between the seal ring 370 and the second seal ring 510. In the illustrated example, when the primary seal 360 engages the ramp members, the seal ring 370 rotates (e.g., clockwise), thereby causing the secondary seal of the seal ring 370 to engage the inside member 310. According to certain embodiments, the seal ring 510 will not rotate (e.g., counter clockwise), and thus the secondary seal of the seal ring 510 will not engage the inside member 310. Thus, in this scenario, the primary seal 360 seals against the outside member 320, while the secondary seal of the seal ring 370 seals against the inside member 310.

Figure 7:
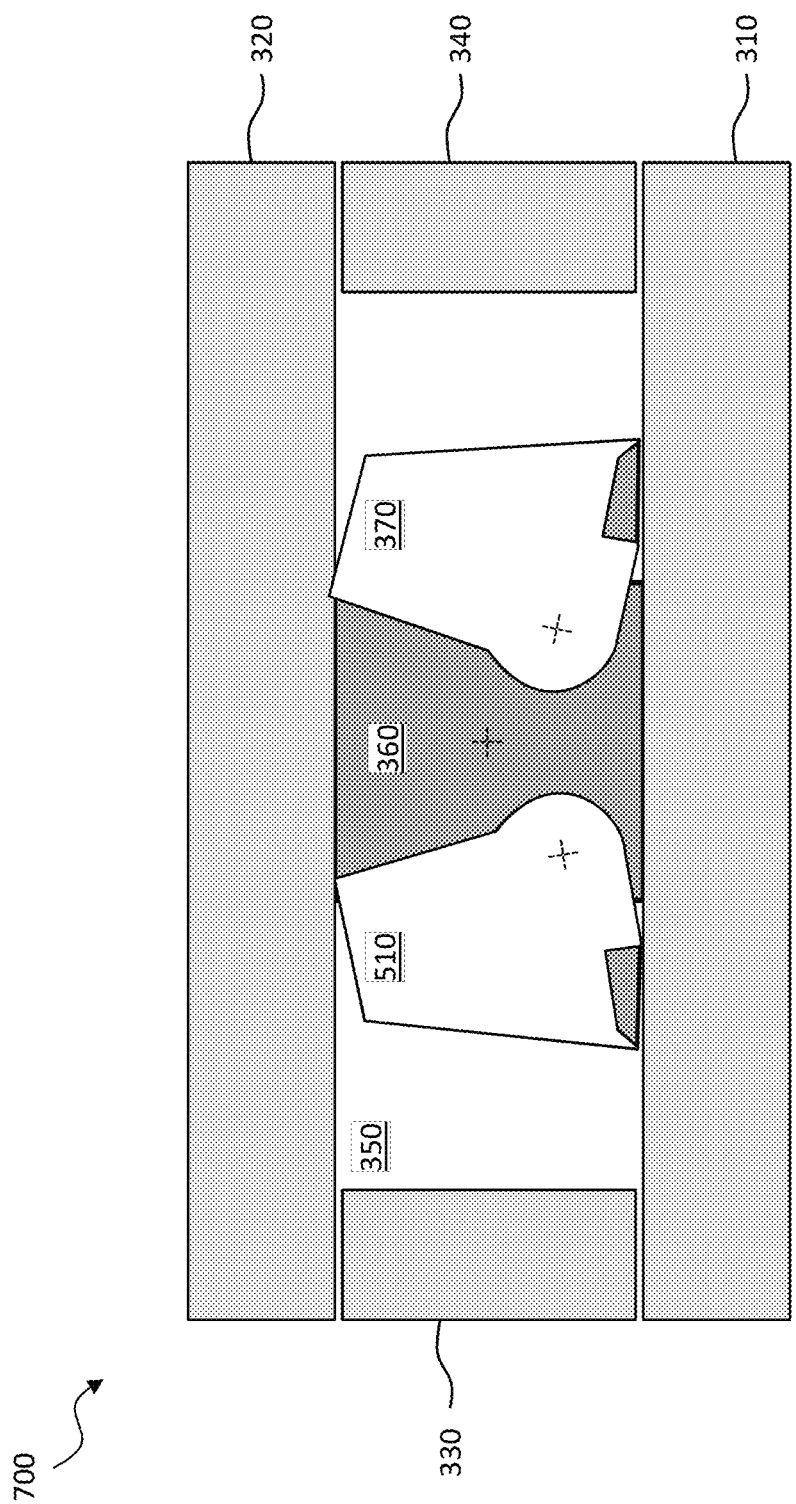

Turning briefly to FIG. 7, illustrated is yet another embodiment of a sealing system 700 designed, manufactured and operated according to the disclosure. The sealing system 700 illustrated in FIG. 7 is in a non-energized state. The sealing system 700, in contrast to the sealing system 500, employs a bonded sealing system. For example, in accordance with this embodiment, the first and second seal rings 370, 510 are bonded with the primary seal 360 as a single unit. Those skilled in the art understand the various different methods for bonding the first and second seal rings 370, 510 with the primary seal 360. In this embodiment, the first and second seal rings 370, 510 may be bonded to the primary seal 360 in a manner that prevents their rotation. Other embodiments may exist wherein the first and second seal rings 370, 510 are bonded to the primary seal 360 in a manner that allow for their rotation.

Aspects disclosed herein include:

A. A sealing ring, the sealing ring including a sealing ring member having an inside diameter face, an outside diameter face, a primary seal side face, and a gland side face, and a secondary seal coupled to at least one of the inside diameter face, the outside diameter face, the primary seal side face or the gland side face.

B. A sealing system, the sealing system including an inside member, an outside member, and two side members forming a seal gland, a primary seal located within the seal gland, and a seal ring located within the seal gland proximate the primary seal, the seal ring including 1) a sealing ring member having an inside diameter face, an outside diameter face, a primary seal side face, and a gland side face, the primary seal side face pointing toward the primary seal, and 2) a secondary seal coupled to at least one of the inside diameter face, the outside diameter face, the primary seal side face or the gland side face.

Aspects A, and B may have one or more of the following additional elements in combination: Element 1: wherein the secondary seal is coupled to the inside diameter face. Element 2: wherein the primary seal side face has a ramp member. Element 3: wherein the ramp member is a lobe member having a centerpoint, and further wherein the centerpoint of the lobe member is positioned more proximate the inside diameter face than the outside diameter face. Element 4: wherein the gland side face slopes inward toward the seal side face as it moves from the inside diameter face to the outside diameter face. Element 5: wherein the gland side face slopes inward from about 2 degrees to about 20 degrees from vertical. Element 6: wherein the gland side face slopes inward from about 6 degrees to about 14 degrees from vertical. Element 7: wherein the outside diameter face slopes upward as it moves from the gland side face to the seal side face. Element 8: wherein the outside diameter face slopes upward from about 2 degrees to about 10 degrees from horizontal. Element 9: wherein the inside diameter face slopes downward as it moves from the gland side face to the seal side face. Element 10: wherein the secondary seal is coupled to the outside diameter face. Element 11: wherein the seal ring is a first seal ring, and further including a second seal ring located within the seal gland proximate an opposite side of the primary seal, the second seal ring including a second sealing ring member having a second inside diameter face, a second outside diameter face, a second primary seal side face, and a second gland side face, the second primary seal side face pointing toward the primary seal, and a second secondary seal coupled to at least one of the second inside diameter face, the second outside diameter face, the second primary seal side face or the second gland side face. Element 12: wherein the first and second seal rings are bonded with the primary seal as a single unit. Element 13: wherein the first seal ring is bonded with the primary seal as a single unit. Element 14: wherein the primary seal is an O-ring seal.

Those skilled in the art to which this application relates will appreciate that other and further additions, deletions, substitutions and modifications may be made to the described embodiments.

What is claimed is:

1. A sealing system, comprising:
an inside member, an outside member, and two side members forming a seal gland;
a primary seal located within the seal gland; and
a seal ring located within the seal gland proximate the primary seal, the seal ring including;
  a sealing ring member having an inside diameter face, an outside diameter face, a primary seal side face, and a gland side face, the primary seal side face pointing toward the primary seal; and
  a secondary seal coupled to at least one of the inside diameter face, the outside diameter face, the primary seal side face or the gland side face, the sealing ring member configured to rotate to move the secondary seal between one state that is disengaged from a sealing surface and another state that is engaged with the sealing surface.

2. The sealing system as recited in claim 1, wherein the seal ring is a first seal ring, and further including a second seal ring located within the seal gland proximate an opposite side of the primary seal, the second seal ring including:
a second sealing ring member having a second inside diameter face, a second outside diameter face, a second primary seal side face, and a second gland side face, the second primary seal side face pointing toward the primary seal; and
a second secondary seal coupled to at least one of the second inside diameter face, the second outside diameter face, the second primary seal side face or the second gland side face.

3. The sealing system as recited in claim 2, wherein the first and second seal rings are bonded with the primary seal as a single unit.

4. The sealing system as recited in claim 1, wherein the first seal ring is bonded with the primary seal as a single unit.

5. The sealing system as recited in claim 1, wherein the primary seal is an O-ring seal.

6. The sealing system as recited in claim 1, wherein the secondary seal is coupled to the inside diameter face.

7. The sealing system as recited in claim 6, wherein the primary seal side face has a ramp member.

8. The sealing system as recited in claim 7, wherein the ramp member is a lobe member having a centerpoint, and further wherein the centerpoint of the lobe member is positioned more proximate the inside diameter face than the outside diameter face.

9. The sealing system as recited in claim 6, wherein the gland side face slopes inward toward the seal side face as it moves from the inside diameter face to the outside diameter face.

10. The sealing system as recited in claim 9, wherein the gland side face slopes inward from about 2 degrees to about 20 degrees from vertical.

11. The sealing system as recited in claim 9, wherein the gland side face slopes inward from about 6 degrees to about 14 degrees from vertical.

12. The sealing system as recited in claim 6, wherein the outside diameter face slopes upward as it moves from the gland side face to the seal side face.

13. The sealing system as recited in claim 12, wherein the outside diameter face slopes upward from about 2 degrees to about 20 degrees from horizontal.

14. The sealing system as recited in claim 6, wherein the inside diameter face slopes downward as it moves from the gland side face to the seal side face.

15. The sealing system as recited in claim 1, wherein the secondary seal is coupled to the outside diameter face.

* * * * *